United States Patent [19]
Turner

[11] Patent Number: 6,048,085
[45] Date of Patent: Apr. 11, 2000

[54] VEHICULAR SPOTLIGHT

[76] Inventor: Bruce E. Turner, 2344 W. 18$^{th}$ St., Jacksonville, Fla. 32209

[21] Appl. No.: 09/116,976

[22] Filed: Jul. 16, 1998

[51] Int. Cl.$^7$ ....................................................... B60Q 1/24
[52] U.S. Cl. .......................... 362/504; 362/526; 362/233
[58] Field of Search ................................... 362/523, 526, 362/233, 503, 504

[56] References Cited

U.S. PATENT DOCUMENTS 4,722,030   1/1988   Bowden ................................... 362/493
4,779,168  10/1988   Montgomery ...................... 362/526 X

*Primary Examiner*—Stephen Husar

[57] ABSTRACT

A vehicular light system for viewing addresses of homes in the absence of ambient light is provided including at least one light assembly situated on an exterior of an automobile. The at least one light assembly serves to deliver a light beam emitted therefrom upward upon the receipt of an upward signal, downward upon the receipt of a downward signal, and left and right upon the receipt of a left and a right signal, respectively. Further provided is a control panel situated within a passenger compartment of the vehicle and connected to the at least one light assembly. The control panel includes a joy stick having a first orientation for transmitting the upward signal to the light assembly, a second orientation for transmitting the downward signal to the light assembly, and a third and fourth orientation for transmitting the left and right signal, respectively, to the light assembly. The control panel further includes a power switch connected to a battery of the automobile for supplying power to the bulb of the light assembly.

5 Claims, 1 Drawing Sheet

VEHICULAR SPOTLIGHT

BACKGROUND OF THE INVENTION

1. Field of the Invention

The present invention relates to police spotlights and more particularly pertains to a new vehicular spotlight for allowing a user to direct a focused beam toward passing houses for reading the addresses thereof in the absence of ambient light.

2. Description of the Prior Art

The use of police spotlights is known in the prior art. More specifically, police spotlights heretofore devised and utilized are known to consist basically of familiar, expected and obvious structural configurations, notwithstanding the myriad of designs encompassed by the crowded prior art which have been developed for the fulfillment of countless objectives and requirements.

Known prior art police spotlights include those set forth in U.S. Pat. Nos. 4,981,363; 5,034,860; Des. No. 358,675; U.S. Pat. Nos. 5,217,291; 4,449,167; and 4,419,721.

In these respects, the vehicular spotlight according to the present invention substantially departs from the conventional concepts and designs of the prior art, and in so doing provides an apparatus primarily developed for the purpose of allowing a user to direct a focused beam toward passing houses for reading the addresses thereof in the absence of ambient light.

SUMMARY OF THE INVENTION

In view of the foregoing disadvantages inherent in the known types of police spotlights now present in the prior art, the present invention provides a new vehicular spotlight construction wherein the same can be utilized for allowing a user to direct a focused beam toward passing houses for reading the addresses thereof in the absence of ambient light.

The general purpose of the present invention, which will be described subsequently in greater detail, is to provide a new vehicular spotlight apparatus and method which has many of the advantages of the police spotlights mentioned heretofore and many novel features that result in a new vehicular spotlight which is not anticipated, rendered obvious, suggested, or even implied by any of the prior art police spotlights, either alone or in any combination thereof.

To attain this, the present invention generally comprises an automobile with a windshield having a frame. Such frame is defined by a rear edge of a hood, a front edge of a roof and a pair of side stanchions extending between the hood and the frame. As shown in FIGS. 1 & 2, a pair of light assemblies are provided each including a housing mounted to a central extent of an associated one of the stanchions of the automobile. Such mounting is accomplished by way of an aperture tab extending therefrom. A spherical bulb housing is pivotally mounted within a front aperture formed in the housing. Formed in a front extent of the bulb housing is a bulb compartment for housing a bulb. Such bulb is adapted to emit a focused light beam upon the receipt of power. Each light assembly is adapted to pivot the bulb housing thereof. During use, the light assembly moves the bulb upward upon the receipt of an upward signal, downward upon the receipt of a downward signal, and left and right upon the receipt of a left and a right signal, respectively. It should be noted that the light assemblies include a left light assembly and a right light assembly. Next provided is a control panel situated within a passenger compartment of the vehicle on the dash thereof and connected to the light assemblies. As shown in FIG. 2, the control panel includes a toggle switch situated on a front face of the panel. The toggle switch has a first orientation for allowing the delivery of power only to the bulb of the right light assembly and a second orientation for allowing the delivery of power only to the bulb of the left light assembly. A joy stick is positioned on the front face of the panel. The joy stick has a first orientation for transmitting the upward signal to the light assembly currently delivered power and a second orientation for transmitting the downward signal to the light assembly currently delivered power. Further, the joy stick is equipped with a third and fourth orientation for transmitting the left and right signal, respectively, to the light assembly currently delivered power. Positioned on the top face of the control panel is a power switch connected to a battery of the automobile. During use, the power switch serves for supplying power to the bulb of the light assembly currently selected by the toggle switch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular spotlight apparatus and method which has many of the advantages of the police spotlights mentioned heretofore and many novel features that result in a new vehicular spotlight which is not anticipated, rendered obvious, suggested, or even implied by any of the prior art police spotlights, either alone or in any combination thereof.

It is another object of the present invention to provide a new vehicular spotlight which may be easily and efficiently manufactured and marketed.

It is a further object of the present invention to provide a new vehicular spotlight which is of a durable and reliable construction.

An even further object of the present invention is to provide a new vehicular spotlight which is susceptible of a low cost of manufacture with regard to both materials and labor, and which accordingly is then susceptible of low prices of sale to the consuming public, thereby making such vehicular spotlight economically available to the buying public.

Still yet another object of the present invention is to provide a new vehicular spotlight which provides in the apparatuses and methods of the prior art some of the advantages thereof, while simultaneously overcoming some of the disadvantages normally associated therewith.

Still another object of the present invention is to provide a new vehicular spotlight for allowing a user to direct a focused beam toward passing houses for reading the addresses thereof in the absence of ambient light.

Even still another object of the present invention is to provide a new vehicular spotlight that includes at least one light assembly situated on an exterior of an automobile. The at least one light assembly serves to deliver a light beam emitted therefrom upward upon the receipt of an upward signal, downward upon the receipt of a downward signal, and left and right upon the receipt of a left and a right signal, respectively. Further provided is a control panel situated within a passenger compartment of the vehicle and connected to the at least one light assembly. The control panel includes a joy stick having a first orientation for transmitting the upward signal to the light assembly, a second orientation for transmitting the downward signal to the light assembly, and a third and fourth orientation for transmitting the left and right signal, respectively, to the light assembly. The control panel further includes a power switch connected to a battery of the automobile for supplying power to the bulb of the light assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
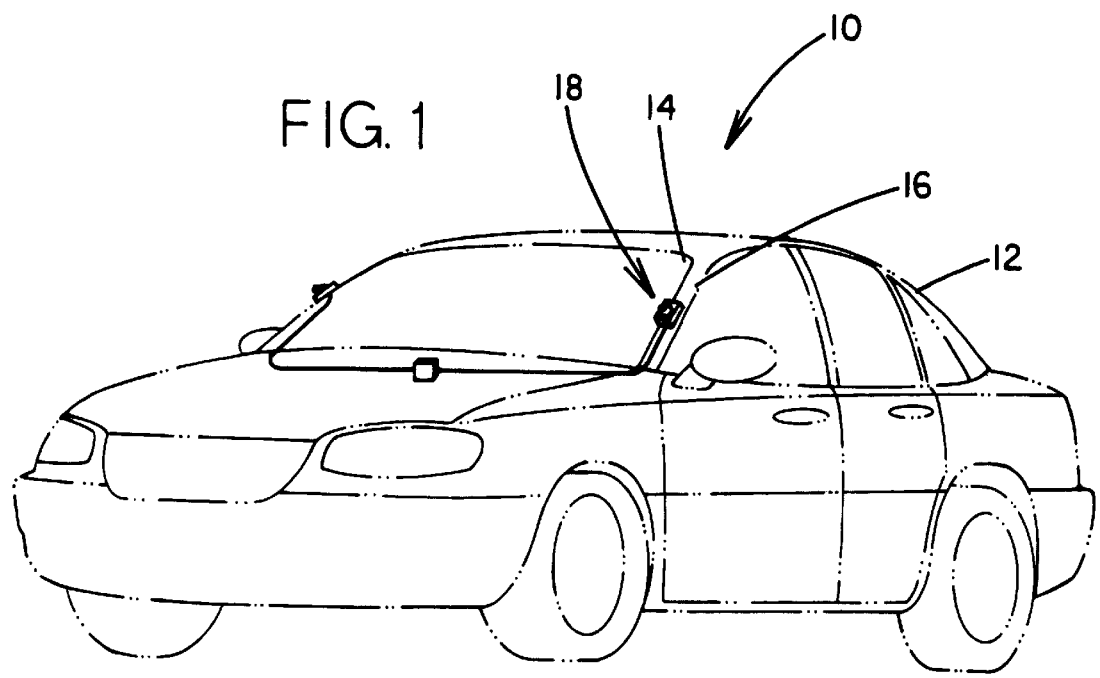
FIG. 1 is a perspective view of a new vehicular spotlight according to the present invention.
Figure 2:
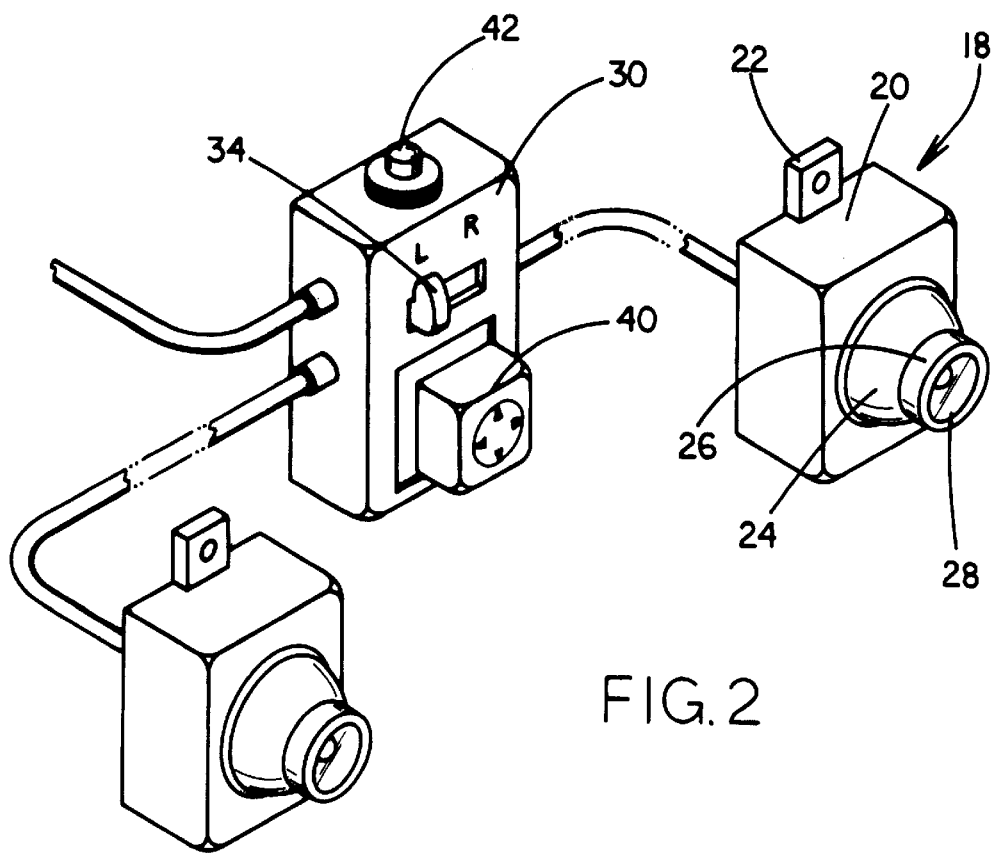
FIG. 2 is a close-up perspective view of the present invention.

With reference now to the drawings, and in particular to FIGS. 1 through 2 thereof, a new vehicular spotlight embodying the principles and concepts of the present invention and generally designated by the reference numeral 10 will be described.

The present invention, as designated in numeral 10, includes an automobile 12 with a windshield having a frame 14. Such frame is defined by a rear edge of a hood, a front edge of a roof and a pair of side stanchions 16 extending between the hood and the frame.

As shown in FIGS. 1 & 2, a pair of light assemblies 18 are provided each including a rectilinear housing 20 mounted to a central extent of an associated one of the stanchions of the automobile. Such mounting is accomplished by way of an aperture tab 22 extending therefrom. A spherical bulb 24 housing is pivotally mounted within a front aperture formed in the housing. Formed in a front extent of the bulb housing is a bulb compartment 26 for housing a bulb 28. Such bulb is adapted to emit a focused light beam upon the receipt of power. A lens is situated over the bulb compartment for protecting the same from debris, adverse weather and the like.

Each light assembly is adapted to pivot the bulb housing thereof. During use, the light assembly moves the bulb upward upon the receipt of an upward signal, downward upon the receipt of a downward signal, and left and right upon the receipt of a left and a right signal, respectively. It should be noted that the light assemblies include a left light assembly and a right light assembly. It should be noted that motor controlled rollers which abut the spherical bulb housing or any other comparable control assembly may be employed for controlling the movement of the light assemblies as set forth hereinabove.

Next provided is a control panel 30 situated within a passenger compartment of the vehicle on the dash thereof and connected to the light assemblies. As shown in FIG. 2, the control panel includes a toggle switch 34 situated on a front face of the panel. The toggle switch has a first orientation for allowing the delivery of power only to the bulb of the right light assembly and a second orientation for allowing the delivery of power only to the bulb of the left light assembly.

The control panel further includes a joy stick 40 positioned on the front face thereof. The joy stick preferably comprises a cube and a plate mounted thereon. Such plate is in turn slidably coupled within a square recess formed in the panel. The cube has a front face with four compass arrows formed thereon. In the preferred embodiment, the cube has an unbiased orientation positioned at a central extent of the recess.

During use, the joy stick has a first upward biased orientation for transmitting the upward signal to the light assembly currently delivered power and a second downward biased orientation for transmitting the downward signal to the light assembly currently delivered power. Further, the joy stick is equipped with a third and fourth biased orientation for transmitting the left and right signal, respectively, to the light assembly currently delivered power. It should be noted that a user may be bias the joystick to a corner of the square recess of the panel to transmit a pair of signals to the light assembly currently delivered power.

Positioned on the top face of the control panel is a power switch 42 connected to a battery of the automobile. During use, the power switch serves for supplying power to the bulb of the light assembly currently selected by the toggle switch. The present invention thus allows a user to direct a focused beam toward passing houses for reading the addresses thereof in the absence of ambient light.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular light system for viewing addresses of homes in the absence of ambient light comprising, in combination:

an automobile including a windshield with a frame including a rear edge of a hood, a front edge of a roof and a pair of side stanchions extending between the hood and the frame;

a pair of light assemblies each including a housing mounted to a central extent of an associated one of the stanchions of the automobile via an aperture tab extending therefrom, a spherical bulb housing pivotally mounted within a front aperture formed in the housing, and a bulb compartment formed in a front extent of the bulb housing for housing a bulb which is adapted to emit a focused light beam upon the receipt of power, each light assembly adapted to pivot the bulb housing thereof such that the bulb moves upward upon the receipt of an upward signal, downward upon the receipt of a downward signal, and left and right upon the receipt of a left and a right signal, respectively, the light assemblies including a left light assembly and a right light assembly;

a control panel situated within a passenger compartment of the vehicle on the dash thereof and connected to the light assemblies, the control panel including a toggle switch situated on a front face of the panel having a first orientation for allowing the delivery of power only to the bulb of the right light assembly and a second orientation for allowing the delivery of power only to the bulb of the left light assembly, a joy stick situated on the front face of the panel and having a first orientation for transmitting the upward signal to the light assembly currently delivered power, a second orientation for transmitting the downward signal to the light assembly currently delivered power, and a third and fourth orientation for transmitting the left and right signal, respectively, to the light assembly currently delivered power, the control panel further including a power switch positioned on the top face of the control panel and connected to a battery of the automobile for supplying power to the bulb of the light assembly currently selected by the toggle switch.

2. A vehicular light system for viewing addresses of homes in the absence of ambient light comprising:

an automobile including a windshield positioned between a pair of laterally spaced side stanchions;

a pair of light assemblies situated on an exterior of the automobile, each of the light assemblies including a housing being mounted to one of the stanchions of the automobile, a bulb housing pivotally mounted in a front aperture formed in the housing, and a bulb compartment in the bulb housing for housing a bulb for emitting a focused light beam, the bulb housing of each light assembly being adapted to project a light beam upward upon the receipt of an upward signal, downward upon the receipt of a downward signal, and left and right upon the receipt of a left and a right signal, respectively;

a control panel situated within a passenger compartment of the vehicle and connected to the at least one light assembly, the control panel including a joy stick having a first orientation for transmitting the upward signal to the light assembly, a second orientation for transmitting the downward signal to the light assembly, and a third and fourth orientation for transmitting the left and right signal, respectively, to the light assembly, the control panel further including a power switch connected to a battery of the automobile for supplying power to the bulb of the light assembly.

3. A vehicular light system as set forth in claim 2 wherein the light assemblies include a left light assembly and a right light assembly.

4. A vehicular light system as set forth in claim 3 wherein the control panel has a toggle switch for determining to which light assembly power is delivered.

5. A vehicular light system as set forth in claim 4 wherein signals are only delivered to the light assembly to which power is delivered.

* * * * *